US000001991B1

(19) United States

(12) Statutory Invention Registration (10) Reg. No.: US H1991 H

Bolen et al. (43) Published: Sep. 4, 2001

(54) CLOCKSPRING USING FLEXIBLE PRINTED WIRING

(75) Inventors: Patrick A. Bolen; Brent E. Henderson, both of Carthage, IL (US)

(73) Assignee: Methode Electronics, Inc., Chicago, IL (US)

(21) Appl. No.: 09/346,566

(22) Filed: Jul. 1, 1999

(51) Int. Cl.[7] ..... H01R 3/00

(52) U.S. Cl. ..... 439/164; 149/620

(58) Field of Search ..... 439/164, 162, 439/15, 620

(56) References Cited

U.S. PATENT DOCUMENTS 4,714,435 * 12/1987 Stipanuk et al. ..... 439/496
5,304,071 * 4/1994 Bannai et al. ..... 439/164
5,456,616 * 10/1995 Fuerst et al. ..... 439/620
5,460,535 * 10/1995 Bolen ..... 439/164
5,474,473 * 12/1995 Perretta et al. ..... 439/610
5,692,925 * 12/1997 Bogese, II ..... 439/620

* cited by examiner

*Primary Examiner*—Harold J. Tudor

(74) *Attorney, Agent, or Firm*—Karl D. Kovach; David L. Newman

(57) ABSTRACT

A clockspring including a housing, a hub, and flexible printed wiring. The flexible printed wiring electrically connecting the hub to the housing. The hub mounted in the housing. The hub being able to rotate relative to the housing. The flexible printed wiring able to be affixed with components such as resistors, capacitors, inductors, and integrated circuits.

22 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLOCKSPRING USING FLEXIBLE PRINTED WIRING

BACKGROUND OF THE INVENTION

1. Field of the Invention

The present invention pertains to a clockspring. The invention more particularly concerns a clockspring using flexible printed wiring to connect the rotating hub to the stationary housing of the clockspring.

2. Discussion of the Background

Clocksprings are well known in the art where a clockspring electrically connects a stationary crash sensor to a rotatable airbag. Automotive manufacturers are increasingly integrating many functions on the steering column, on stalks projecting outward from the steering column, and on the steering wheel. In short, automotive manufacturers demand that existing components become more reliable, inexpensive, lighter, and perform more functions.

Clocksprings, typically, include a housing, a hub, and flexible flat cable. The flexible flat cable electrically connects the stationary housing to the rotatable hub. FIG. 5 is a partial perspective view of a related art flat cable 80. The flat cable 80 has two insulation layers 81, 82. The two insulation layers 81, 82 surround conductors 83. The flexible flat cable 80 conveys electrical signals.

Thus, there is a need for a small clockspring that can perform more functions than clocksprings currently installed in vehicles.

SUMMARY OF THE INVENTION

Therefore, it is an object of the present invention to provide a clockspring which is inexpensive to manufacture, easy to install, small, includes many functions including signal conditioning hardware.

In one form of the invention, the clockspring includes a housing and a hub. The hub being rotatably mounted to the housing. The hub being connected to the housing via flexible printed wiring.

In another form of the invention, a vehicle includes an automobile. The automobile has a crash detection sensor and an airbag. Additionally, the automobile has a clockspring that electrically connects the airbag to the crash detection sensor. Furthermore, the clockspring has a housing and a hub. The hub being rotatably mounted in the housing. The hub and housing are electrically connected to each other via flexible printed wiring.

Thus, Applicants' invention provides a clockspring which is compact, and includes many electrical signal conditioning functions. These and other features of the invention are set forth below in the following detailed description of the presently preferred embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
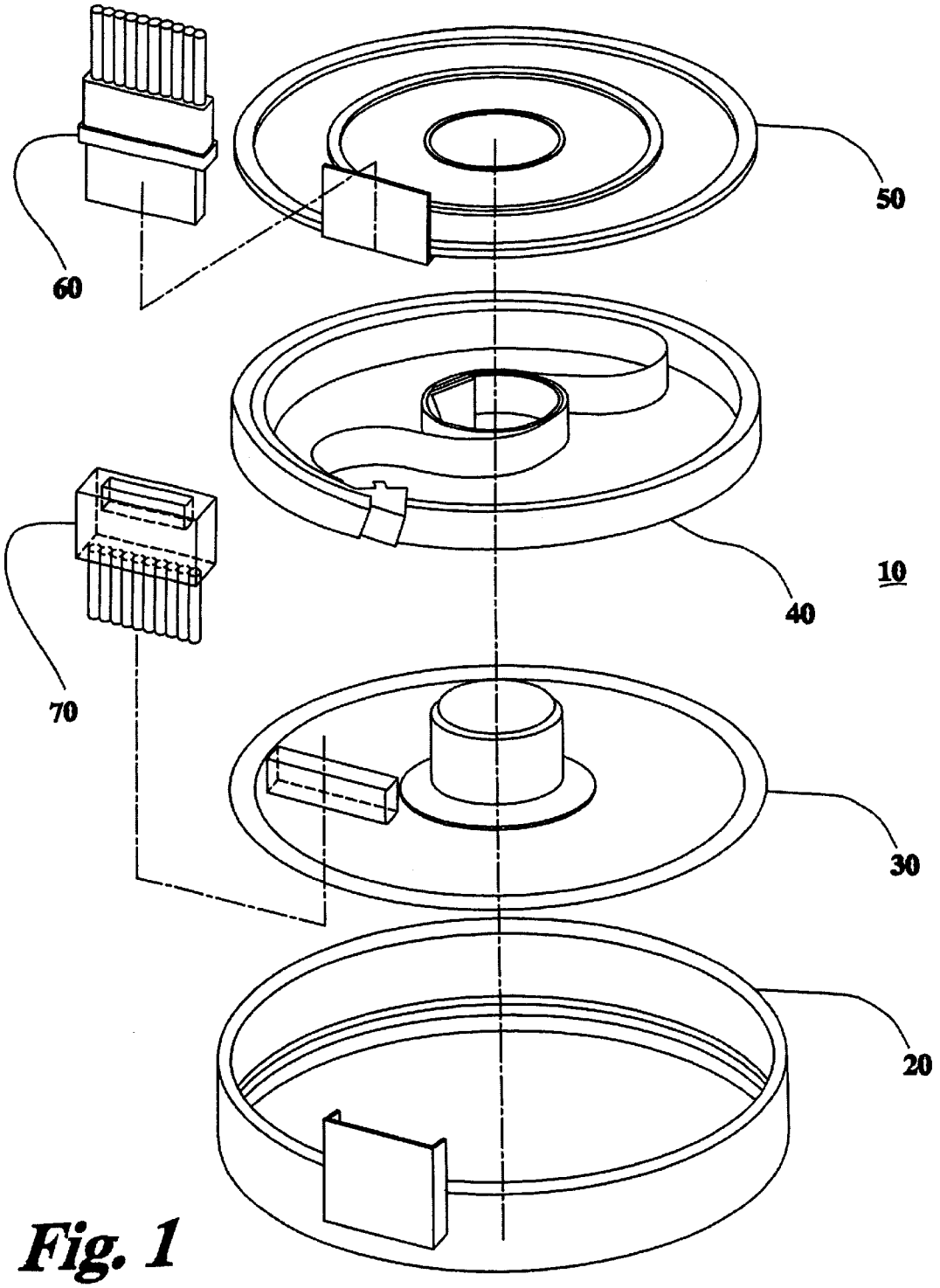
FIG. 1 is an exploded perspective view of a clockspring according to the invention.

Referring now to the drawings, wherein like reference numerals designate identical or corresponding parts throughout the several views, and more particularly to FIGS. 1–4 thereof, a first embodiment of the present invention is a clockspring 10 having a housing 20, a hub 30, and flexible printed wiring 40.

FIG. 1 is an exploded perspective view of the clockspring 10. The hub 30 and flexible printed wiring 40 are contained within the housing 20 by the cover 50 which snaps into place. An inner diameter backbone 70 attaches to the hub 30 and to the printed conductors of the flexible printed wiring 40. An outer diameter backbone 60 attaches to the housing 20 and cover 50, and to the printed conductors of the flexible printed wiring 40.

Flexible printed wiring is typically defined as an arrangement of printed conductors using a flexible insulating base or substrate material. The arrangement of conductors distinguishes flexible printed wiring from flat flexible cable. Flexible printed wiring is able to be bent or flexed repeatedly. Additionally, electrical components such as resistors, capacitors, inductors, and integrated circuit chips can be formed in or attached to the flexible printed wiring thus making such wiring an active component and not a passive component such as traditional flat cable 80. The Flexible Circuitry Design Guide by Sheldahl Inc., of Northfield, Minn., published in 1984, sets forth the construction and definition of flexible printed wiring, and is hereby incorporated herein by reference.

To produce flexible printed wiring a laminate of conductive metal foil laminated to a dielectric film, the basic steps are: print or photo image conductor pattern, cover bare conductor image with protective layer of solder or other plating, strip away plating resist material, etch conductive metal from areas not used as conductor traces, apply protective coating over conductors, blank the circuit to final shape.

The flexible printed wiring allows for compact arrangements of components thus minimizing the size of the finished part, i.e., a smaller clockspring; and it allows for the installation of signal conditioning hardware within the clockspring without taking up additonal space as compared to a clockspring using flat cable.

Figure 2:
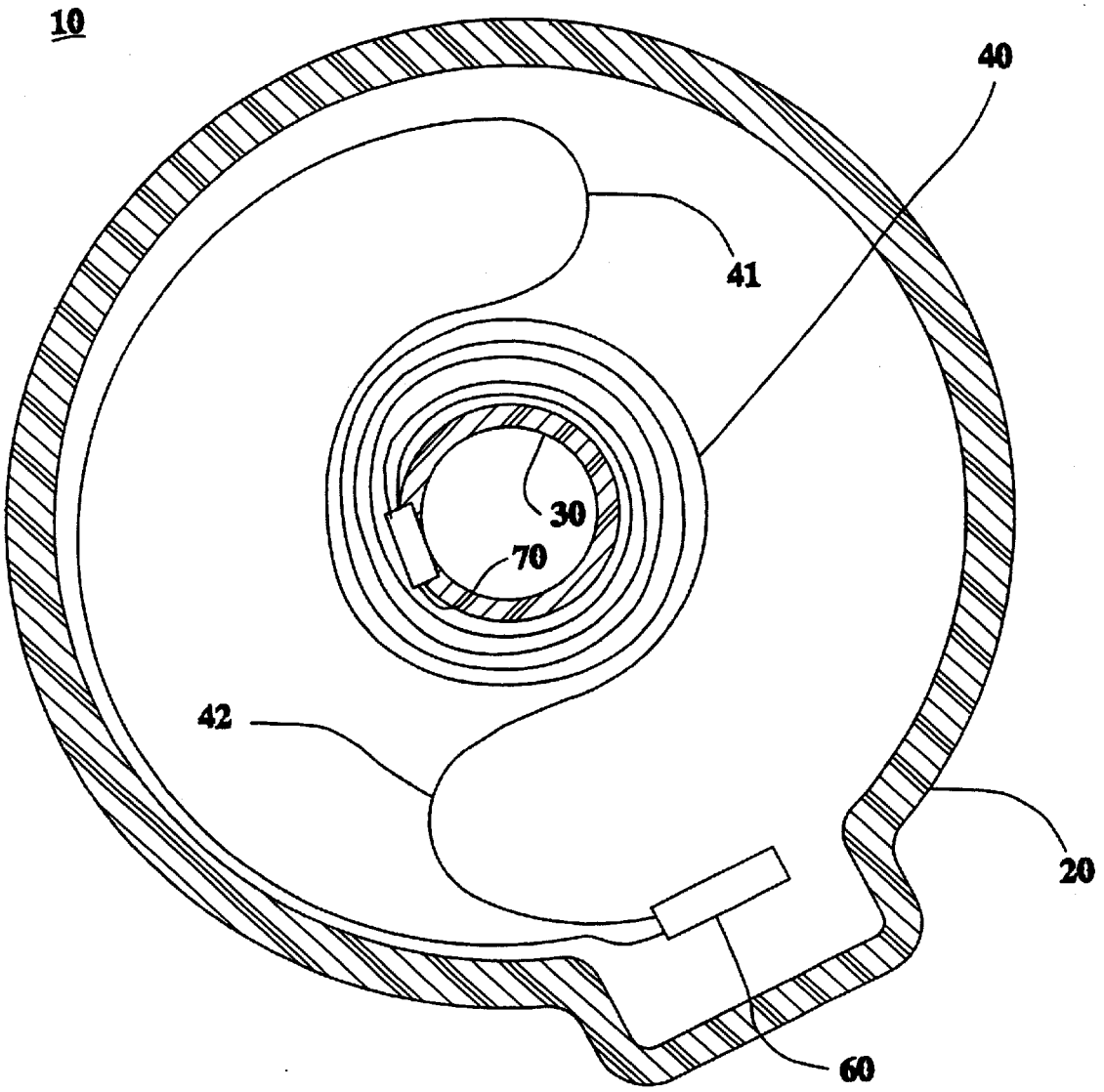
FIG. 2 is a cross-sectional, top view of the clockspring of FIG. 1.

FIG. 2 is a partial cross-sectional top view of the clockspring 10 of FIG. 1 in a first position after being rotated in a first direction. As shown in FIG. 2, the flexible printed wiring 40 is actually two separate flexible printed wirings 41, 42. However, a clockspring having just one or more than two flexible printed wiring assembles is also achievable. FIG. 2 further illustrates the housing 20 and hub 30, and their respective backbones 60, 70. In FIG. 2, the flexible printed wiring 40 is substantially wrapped around the hub 30.

Figure 3:
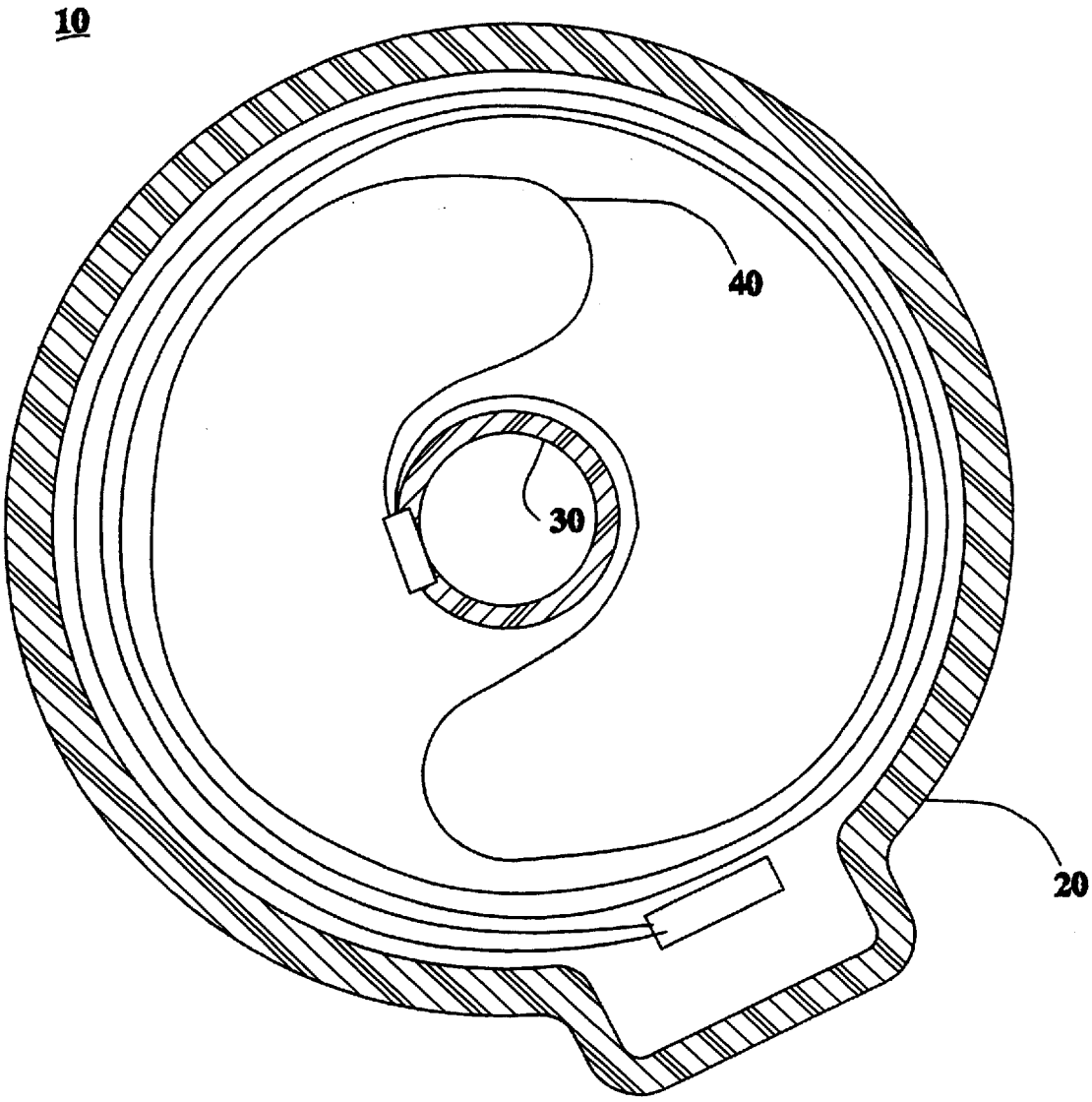
FIG. 3 is a cross-sectional, top view of the clockspring of FIG. 1.

FIG. 3 is a partial cross-sectional top view of the clockspring 10 of FIG. 1 in a second position after being rotated in a second direction, and is otherwise similar to FIG. 2. However, the flexible printed wiring 40, as shown in FIG. 3, is substantially wrapped around an inside diameter surface of the housing 20. Compliant rollers mounted on a carrier (not shown) can guide the flexible printed wiring 40 around the hub 30 and the housing 20. The second rotated direction is opposite the first rotated direction.

Figure 4:
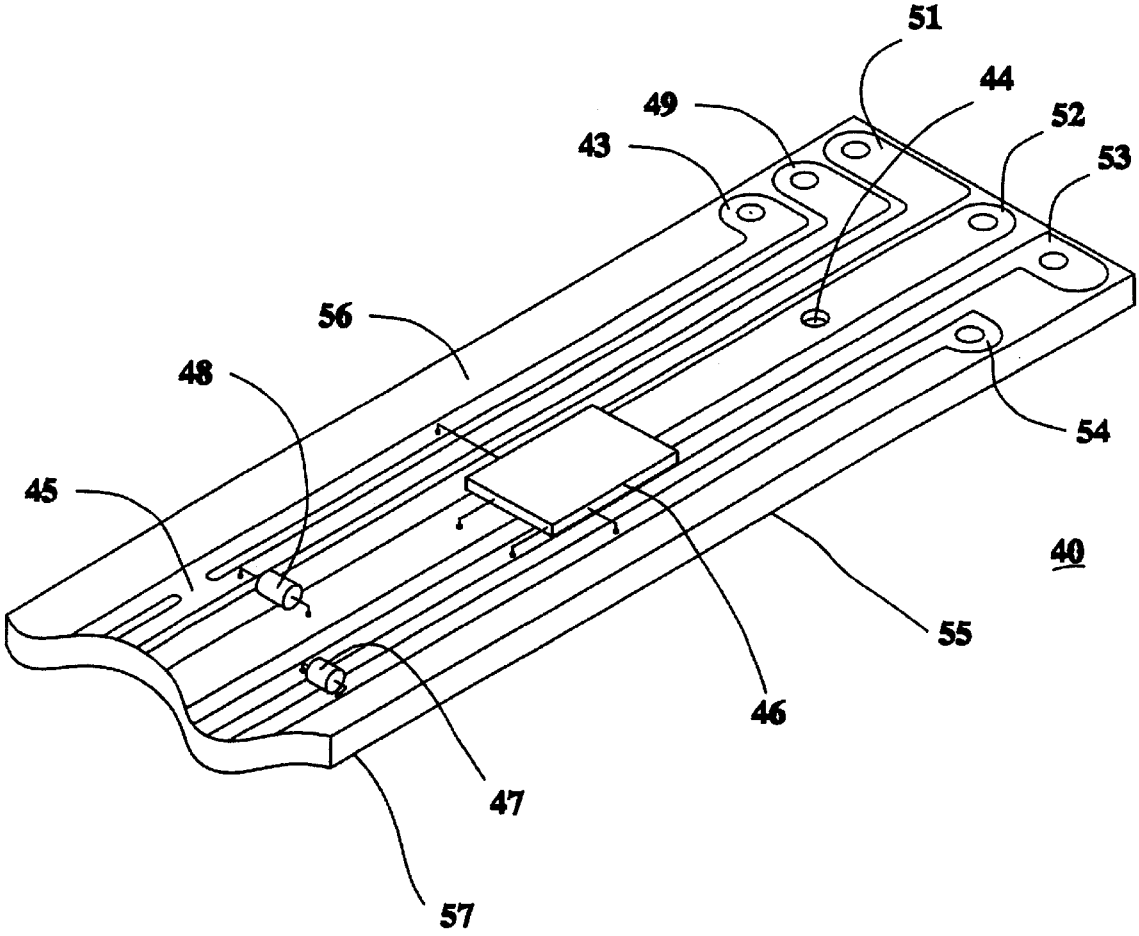
FIG. 4 is a partial perspective view of flexible printed wiring.
Figure 5:
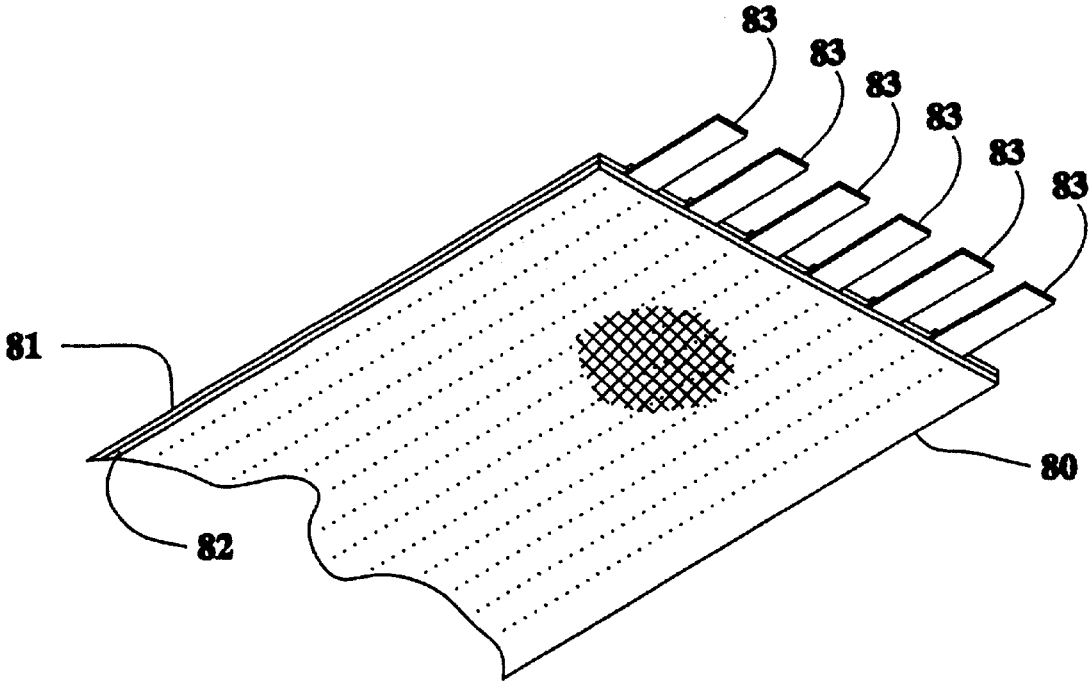
(RELATED ART) Fig. 5
FIG. 5 is a partial perspective view of a related flat cable.

FIG. 4 is a partial perspective view of one wiring assembly (41, 42) of the flexible printed wiring 40. The flexible printed wiring 40 includes printed conductors or traces 43, 49, 51, 52, 53, and 54 on one broad surface 56 of the substrate 55. The traces may contact each other via conductive side traces. A conductive side trace 45 is shown in FIG. 4 connecting trace 43 to trace 49. Additionally, traces (not shown) can be formed on the other broad surface 57 of the flexible printed wiring 40. Furthermore, traces on both broad surfaces 56, 57 can be electrically connected to each other via conductive through holes. One such conductive through hole 44 is shown electrically connecting trace 52 on broad surface 56 to a trace (not shown) on the other broad surface 57. The through hole 44 penetrates through the substrate 55 and is plated with a conductive material such as copper. The traces can convey the traditional signals conveyed by clocksprings, however, they may also convey power, ground, and carrier signals, as examples. In a preferred embodiment, six conductive traces are provided by the flexible printed wiring 40.

FIG. 4 shows that signal conditioning components can be attached to the flexible printed wiring. Electrical component 47 is electrically connected to traces 53 and 54.

Electrical component 48 is electrically connected to traces 49 and 52. The electrical components 47, 48 can be resistors, capacitors, inductors, diodes, etc or the electrical components 47, 48 can be assemblies of such devices. The electrical components 47, 48 are shown as being large, however, the electrical components 47, 48 can be formed on the substrate 55 much like the traces. The electrical components 47, 48 can perform, as an example, signal filtering functions.

FIG. 4 also shows an integrated circuit chip 46 attached to traces 43, 52, 53, and 54. The integrated circuit chip 46 is shown as being large, however, it may be formed on the surface of the substrate 55. The integrated circuit chip 46 can monitor and maintain voltage, digitize signals, analyze signals, etc. These components may be mounted to the printed wiring substrate 55 via wire bonding, SMT, through hole, IDC or other known mounting methods.

In practice, the flexible printed wiring 40 is connected to the housing 20 and to the hub 30, and to their respective backbones 60, 70. The traces of the flexible printed wiring 40 can be attached to the conductors of the backbones 60 and 70, by way of soldered, crimped, pinch fitted, and etc. In the related art, the conductors 83 of the flexible cable 80 are welded to the conductors of the backbones 60, 70, which is a time consuming process, an expensive process, and a process which leads to the housing of the clockspring being larger than the clockspring 10 of the invention. Use of flexible printed wiring 40 allows for the clockspring 10 to contain more electronics than clocksprings currently in use. As such the clockspring 10 can contain within itself functions that were contained elsewhere on the vehicle. Additionally, new functions can be contained within the clockspring 10. Furthermore, due to the attachment method of the flexible printed wiring 40 to the backbones 60 and 70, as compared to the related flexible cable 80, the clockspring 10 is a smaller package than existing clocksprings. The smaller clockspring package 10 allows more components and device to placed in the space which was once occupied by the current, larger, type of clockspring which does not employ flexible printed wiring.

Obviously, numerous modifications and variations of the present invention are possible in light of the above teachings. It is therefore to be understood that within the scope of the appended claims, the invention may be practiced otherwise than as specifically described herein.

What is claimed is:

1. A clockspring comprising:

a housing;

a hub rotatably mounted to the housing; and flexible printed wiring having electrical conductors, the flexible printed wiring electrically connects the housing to the hub, and wherein, in a first position of the hub relative to the housing, the flexible printed wiring is substantially wrapped around the hub, and wherein, in a second position of the hub relative to the housing, the flexible printed wiring is substantially wrapped around an inner diameter surface of the housing, and whereby the first position being achieved by rotating the hub relative to the housing in a first direction, and whereby the second position being achieved by rotating the hub relative to the housing in a second direction, and wherein the first direction being opposite the second direction.

2. The clockspring according to claim 1 wherein the flexible printed wiring includes a resistor connected to at least two of the electrical conductors of the flexible printed wiring.

3. The clockspring according to claim 1 wherein the flexible printed wiring includes a capacitor connected to at least two of the electrical conductors of the flexible printed wiring.

4. The clockspring according to claim 1 wherein the flexible printed wiring includes an inductor connected to at least two of the electrical conductors of the flexible printed wiring.

5. The clockspring according to claim 1 wherein the flexible printed wiring includes an integrated circuit chip connected to at least two of the electrical conductors of the flexible printed wiring.

6. The clockspring according to claim 1 wherein at least two of the electrical conductors are electrically connected to each other.

7. The clockspring according to claim 1 wherein the flexible printed wiring has two broad surfaces, and wherein the electrical conductors are positioned on the two broad surfaces.

8. The clockspring according to claim 7 wherein one of the electrical conductors positioned on one broad surface of the flexible printed wiring is electrically connected to one of the electrical conductors positioned on the other broad surface of the flexible printed wiring.

9. The clockspring according to claim 2 wherein the flexible printed wiring includes a capacitor connected to at least two of the electrical conductors of the flexible printed wiring.

10. The clockspring according to claim 2 wherein the flexible printed wiring includes an inductor connected to at least two of the electrical conductors of the flexible printed wiring.

11. The clockspring according to claim 2 wherein the flexible printed wiring includes an integrated circuit chip connected to at least two of the electrical conductors of the flexible printed wiring.

12. The clockspring according to claim 2 wherein at least two of the electrical conductors are electrically connected to each other.

13. The clockspring according to claim 2 wherein the flexible printed wiring has two broad surfaces, and wherein the electrical conductors are positioned on the two broad surfaces.

14. The clockspring according to claim 13 wherein one of the electrical conductors positioned on one broad surface of the flexible printed wiring is electrically connected to one of the electrical conductors positioned on the other broad surface of the flexible printed wiring.

15. The clockspring according to claim 3 wherein the flexible printed wiring includes an inductor connected to at least two of the electrical conductors of the flexible printed wiring.

16. The clockspring according to claim 3 wherein the flexible printed wiring includes an integrated circuit chip connected to at least two of the electrical conductors of the flexible printed wiring.

17. The clockspring according to claim 3 wherein at least two of the electrical conductors are electrically connected to each other.

18. The clockspring according to claim 3 wherein the flexible printed wiring has two broad surfaces, and wherein the electrical conductors are positioned on the two broad surfaces.

19. The clockspring according to claim 18 wherein one of the electrical conductors positioned on one broad surface of the flexible printed wiring is electrically connected to one of the electrical conductors positioned on the other broad surface of the flexible printed wiring.

20. A vehicle comprising:

an automobile having an airbag and a crash detection sensor;

a clockspring having a hub, a housing, and flexible printed wiring, the hub rotatably mounted to the housing, the housing mounted to the automobile, the housing electrically connecting the crash detection sensor, the hub electrically connected to the airbag, the flexible printed wiring electrically connects the hub to the housing, and wherein the flexible printed wiring includes electrical components electrically connected to the electrical conductors of the flexible printed wiring.

21. A clockspring according to claim 1 wherein the flexible printed wiring includes electrical components electrically connected to the electrical conductors of the flexible printed wiring.

22. A clockspring comprising:

a housing;

a hub rotatably mounted to the housing; and flexible printed wiring having electrical conductors, the flexible printed wiring electrically connects the housing to the hub, and wherein the flexible printed wiring includes electrical components electrically connected to the electrical conductors of the flexible printed wiring.

* * * * *